US009008043B2

(12) United States Patent
Sun et al.

(10) Patent No.: US 9,008,043 B2
(45) Date of Patent: Apr. 14, 2015

(54) METHOD FOR PROCESSING DATA ASSOCIATED WITH LOCATION AREA UPDATE IN A WIRELESS COMMUNICATION SYSTEM

(71) Applicant: LG Electronics Inc., Seoul (KR)

(72) Inventors: Li-Hsiang Sun, San Diego, CA (US); Jae Hyun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 13/631,528

(22) Filed: Sep. 28, 2012

(65) Prior Publication Data

US 2013/0083775 A1    Apr. 4, 2013

Related U.S. Application Data

(60) Provisional application No. 61/541,959, filed on Sep. 30, 2011, provisional application No. 61/556,129, filed on Nov. 4, 2011, provisional application No. 61/589,817, filed on Jan. 23, 2012.

(30) Foreign Application Priority Data

Sep. 26, 2012  (WO) ............... PCT/KR2012/007738

(51) Int. Cl.
*H04W 4/00* (2009.01)
*H04W 60/00* (2009.01)
*H04W 36/14* (2009.01)

(52) U.S. Cl.
CPC .............. *H04W 60/00* (2013.01); *H04W 36/14* (2013.01)

(58) Field of Classification Search
CPC ..... H04W 36/08; H04W 36/14; H04W 36/18; H04W 36/0011

USPC .................................................... 370/331, 335
See application file for complete search history.

(56) References Cited

U.S. PATENT DOCUMENTS

| 2008/0102896 | A1 | 5/2008 | Wang et al. | |
|---|---|---|---|---|
| 2008/0220782 | A1 | 9/2008 | Wang et al. | |
| 2011/0090857 | A1* | 4/2011 | Guo | 370/329 |
| 2011/0312348 | A1* | 12/2011 | Kulakov et al. | 455/458 |
| 2012/0087229 | A1* | 4/2012 | Mantri | 370/201 |
| 2012/0179790 | A1 | 7/2012 | Kim et al. | |
| 2012/0218889 | A1* | 8/2012 | Watfa et al. | 370/230 |
| 2012/0257571 | A1* | 10/2012 | Liao | 370/328 |

FOREIGN PATENT DOCUMENTS

| KR | 10-2009-0085640 A | 8/2009 |
|---|---|---|
| KR | 10-2009-0126282 A | 12/2009 |
| KR | 10-2011-0011574 A | 2/2011 |

* cited by examiner

*Primary Examiner* — Michael Thier
*Assistant Examiner* — Brian Cox
(74) *Attorney, Agent, or Firm* — Birch, Stewart, Kolasch & Birch, LLP

(57) ABSTRACT

The technical features of this document provide a method and wireless apparatus for performing UE's location area update in a communication system comprising two different radio access network (e.g., E-UTRAN and GERAN/UTRAN). In the communication system, various entities such as MME, VLR, RNC and VLR are included. This document provides a condition when a location area update (LAU) procedure is initiated. In particular, the LAU is performed when the UE which has first performed a combined TAU to the MATE and VLR moves from an E-UTRAN cell to a GERAN/UTRAN cell both belonging to a same location area (LA).

7 Claims, 11 Drawing Sheets

US 9,008,043 B2

METHOD FOR PROCESSING DATA ASSOCIATED WITH LOCATION AREA UPDATE IN A WIRELESS COMMUNICATION SYSTEM

CROSS-REFERENCE TO RELATED APPLICATIONS

The present application for patent claims priority to Provisional Application Nos. 61/541,959 filed on Sep. 30, 2011, 61/556,129 filed on Nov. 4, 2011, and 61/589,817 filed on Jan. 23, 2012, and International Application No. PCT/KR2012/007738 filed on Sep. 26, 2012, which are incorporated herein by reference.

BACKGROUND OF THE INVENTION

1. Field of the invention

The technical features of this document relate to wireless communications, and more particularly, to a method for processing data and performing a location area update procedure in a wireless network comprising different radio access networks.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE. 3GPP LTE technology supports packet based services associated with a packet switched domain (PS-domain) only, however 3GPP does specify fallback for circuit switched services associated with a circuit switched domain (CS-domain) as well. In LTE architecture, the CS-fallback in an Evolved Packet System (EPS) enables the provisioning of voice and traditional CS-domain services. To provide these services, LTE may reuse CS infrastructure when the UE is served by LTE.

SUMMARY OF THE INVENTION

The technical features of this document provide a method and wireless apparatus for performing UE's location area update in a communication system comprising two different radio access network (e.g., E-UTRAN and GERAN/UTRAN). In the communication system, various entities such as MME, VLR, RNC and VLR are included.

In one aspect, the method includes: performing a combined track area update (TAU) to the first type network; receiving a PS mobility management (MM) back-off time value from the first type network; starting a PS MM back-off timer based on the received PS MM back-off time value; and when the UE moves from a first cell of the first type network to a second cell of the second type network, starting a location area update procedure, which is associated with the CS domain, while the PS MM back-off timer is running, wherein the first cell and the second cell belong to a same location area, which is associated with the CS domain.

The method further comprises receiving a TAU accept message indicating whether an idle mode signalling reduction (ISR) function is enabled.

The method further comprises performing an intersystem change from the first type network to the second type network before starting the location area update procedure.

In the method, the UE's a Temporary Identity used in Next update (TIN) is set to a Global Unique Temporary Identity (GUTI)

In another aspect, a user equipment (UE) is further provided. The UE comprises a processor configured for: performing a combined track area update (TAU) to the first type network; receiving a PS mobility management (MM) back-off time value from the first type network; starting a PS MM back-off timer based on the received PS MM back-off time value; and when the UE moves from a first cell of the first type network to a second cell of the second type network, starting a location area update procedure, which is associated with the CS domain, while the PS MM back-off timer is running, wherein the first cell and the second cell belong to a same location area, which is associated with the CS domain.

DESCRIPTION OF EXEMPLARY EMBODIMENTS

The technology described below can be used in various wireless communication systems such as code division multiple access (CDMA), a frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The $3^{rd}$ generation partnership project (3GPP) long term evolution (LTE) is a part of an evolved UNITS (E-UMTS) using the E-UTRA. The 3GPP LTE uses the OFDMA in the downlink and uses the SC-FDMA in the uplink. For clarity of explanation, the following description will focus on the 3GPP LTE (or the 3GPP LTE-A). However, the technical features of this description are not limited thereto.

Figure 1:
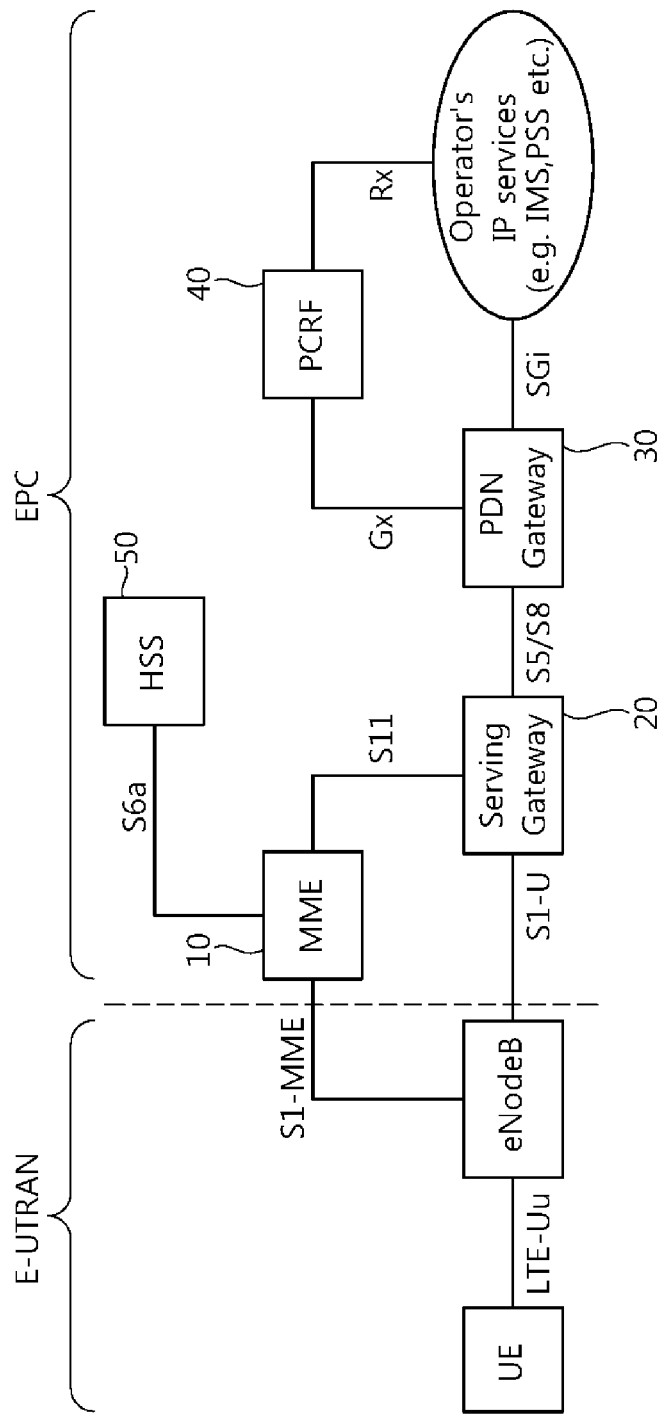
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an Evolved Universal Terrestrial Radio Access Network (E-UTRAN) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of 'EPS bearers' to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in an idle state (known as ECM-IDLE) and temporarily buffers downlink data while the MME initiates paging of the UE to re-establish the bearers. Further, it also serves as the mobility anchor for inter-working with other 3GPP technologies including 2G and 3G network, i.e., GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S5/S8, S11, S6a, Gx, Rx and SGi are defined.

Figure 2:
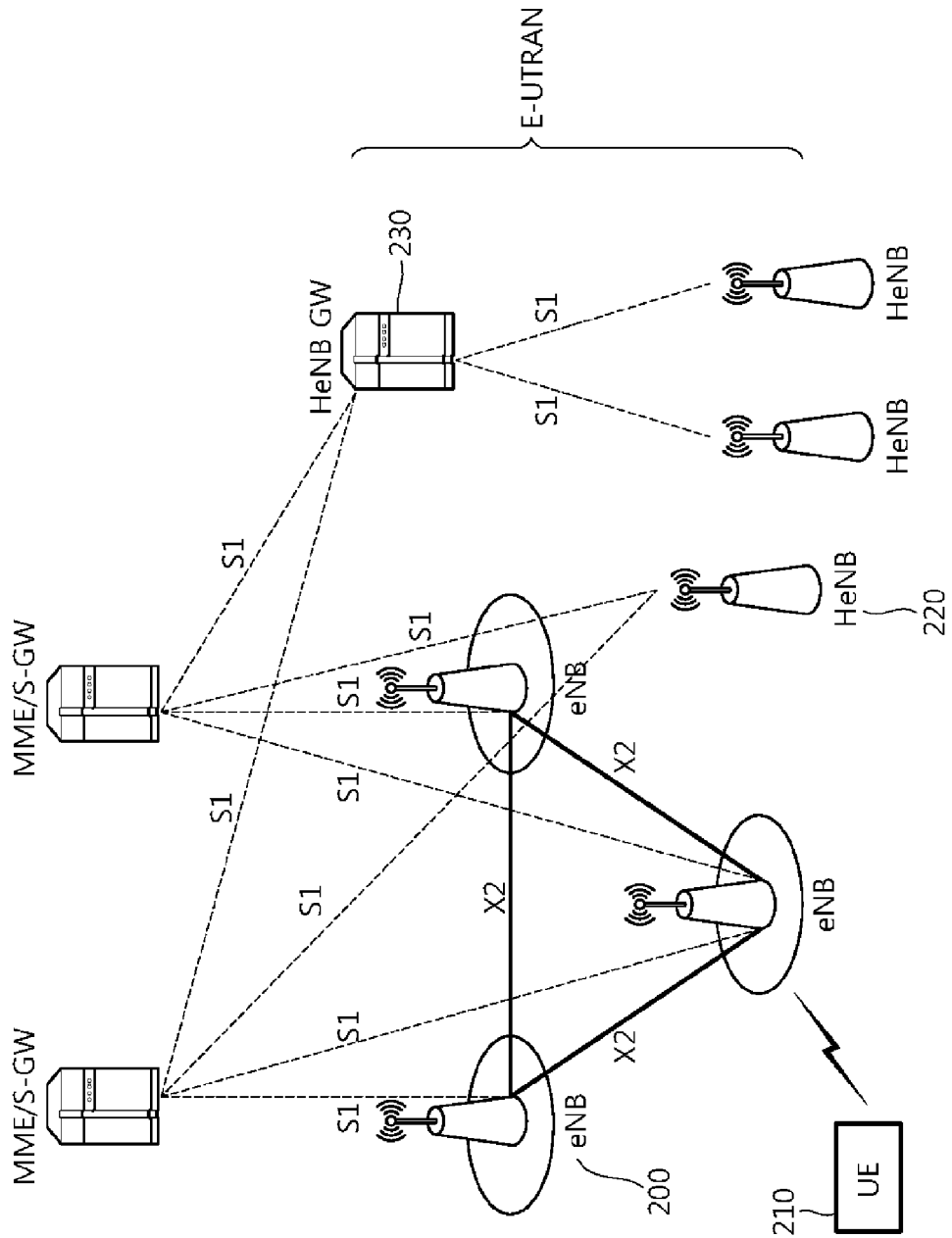
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned Evolved Packet Core EPC elements, more specifically to the Mobility Management Entity (MME) by means of the S1-MME and to the Serving Gateway (S-GW) by means of the S1-U.

The E-TURAN architecture depicted in FIG. 2 may further comprise a Home evolved Node B (HeNB) 220 and an HeNB GW (HeNB gateway) 230.

The HeNB 220 is fundamentally similar to a typical eNB, but it can be simple devices typically installed by end users themselves. The HeNB 220 is also referred to as an BNB (home NB), a femto cell, a home cellular base station, etc. The HeNB 220 behaves like a cellular network with respect to communication devices, which can use their regular cellular network radio interface to communicate with them, and connects to a cellular network operator's core network through the alternate network access, such as Internet access via fiber, DSL or cable subscriptions. In general, the HeNB 220 has a low radio transmission output power compared to the BS owned by mobile communication service providers. Therefore, the service coverage provided by the HeNB 220 is typically smaller than the service coverage provided by the eNB 200. Due to such characteristics, the cell provided by the HeNB 220 is classified as a femto cell in contrast to a macro cell provided by the eNB 200 from a standpoint of the service coverage.

Hereinafter, the concept of an EPS bearer is explained. The EPS (Evolved Packet System) uses the concept of EPS bearers to route IP traffic from a gateway in the PDN (pack data network) to the UE. The EPS bearer is an IP packet flow with a Quality of Service (QoS) between the gateway and the UE. The E-UTRAN and EPC (Evolved Packet Core) together set up and release EPS bearers as required by applications.

The EPS bearer is typically associated with the QoS. Multiple bearers can be established for a user in order to provide different QoS streams or connectivity to different PDNs. For example, a user might be engaged in a voice (e.g., VoIP) call while at the same time performing web browsing or File Transfer Protocol (FTP) download. A VoIP bearer would provide the necessary QoS for the voice call, while a best-effort bearer would be suitable for the web browsing or FTP session.

Broadly, EPS bearers can be classified into two categories based on the nature of the QoS they provide. The two categories are Minimum Guaranteed Bit Rate (GBR) bearers and Non-GBR bearers. The GBR bearers have an associated GBR value for which dedicated transmission resources are permanently allocated at bearer establishment/modification. Bit rates higher than the GBR may be allowed for a GBR bearer if resources are available. On the other hand, the non-GBR bearers do not guarantee any particular bit rate. For these bearers, no bandwidth resources are allocated permanently to the bearer.

Further, EPS bearers can be classified in a different manner. In particular, the EPS bearers can be classified into a default bearer and a dedicated bearer. The default bearer is an EPS bearer which is first established for a new PDN connection and remains established throughout the lifetime of the PDN connection. The default bearer gets established with every new PDN connection. Namely, when the UE connects to the P-GW by means of a procedure called 'Initial Attach', a new or default bearer is created and its context remains established throughout the lifetime of that PDN connection. The UE can be attached to more than one P-GW, and thus the UE can have more than one default bearer. The default EPS bearer is a non-GBR bearer and associated with a best effort QoS, wherein the best effort QoS is the lowest of all QoS traffic classes. Bearers which are not created at the initial attach procedure can be referred to as dedicated bearers. The dedicated bearer is an EPS bearer that is associated with uplink packet filters in the UE and downlink packet filters in the PDN GW where the filters only match certain packets.

Hereinafter, the relationship of the EPS bearer and lower layer bearers such as S1, S5/S8, radio bearers and E-RAB is explained.

Figure 3:
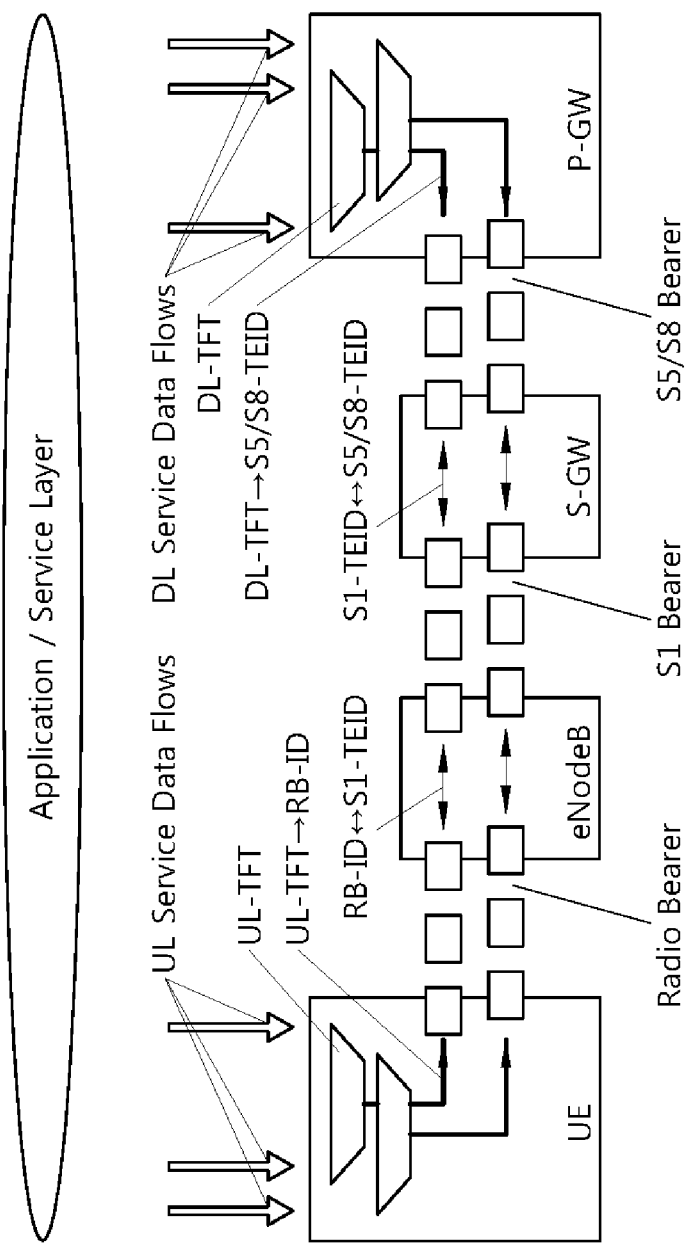
FIG. 3 is a view illustrating EPS bearers crossing multiple interfaces.

The EPS bearer has to cross multiple interfaces as shown in FIG. 3—the S5/S8 interface from the P-GW to the S-GW, the S1 interface from the S-GW to the eNodeB, and the radio interface (also known as the LTE-Uu interface) from the eNodeB to the UE. Across each interface, the EPS bearer is mapped onto a lower layer bearer, each with its own bearer identity. Each node keeps track of the binding between the bearer IDs across its different interfaces.

An S5/S8 bearer transports the packets of the EPS bearer between the P-GW and the S-GW. The S-GW stores a one-to-one mapping between an S1 bearer and an S5/S8 bearer. Each bearer is identified by the GTP (GPRS Tunneling Protocol) based Tunnel Endpoint ID (also known as a TEID) across both interfaces.

An S1 bearer transports the packets of an EPS bearer between the S-GW and the eNodeB. A radio bearer (also known as a radio data bearer) transports the packets of an EPS bearer between the UE and the eNodeB. Each bearer is identified by the GTP (GPRS Tunneling Protocol) tunnel endpoint ID (also known as a TEID or a GTP TEID) across both interfaces.

Further, the concept of the E-RAB (E-UTRAN Radio Access Bearer) may be used. An E-RAB transports the packets of an EPS bearer between the UE and the EPC (GPRS Tunneling Protocol), more specifically to the S-GW through eNB. When an E-RAB exists, there is a one-to-one mapping between this E-RAB and an EPS bearer.

IP packets mapped to the same EPS bearer receive the same bearer-level packet forwarding treatment (e.g., scheduling policy, queue management policy, rate shaping policy, or RLC configuration). Providing different bearer-level QoS thus requires that a separate EPS bearer is established for each QoS flow, and user IP packets must be filtered into the different EPS bearers.

Hereinafter, the concept of Non-Access Stratum (NAS) states and Access Stratum (AS) states. A UE's behavior can be defined using a number of states, i.e., NAS and AS states, which describe whether the UE is registered with the Evolved Packet Core (EPC) and whether it is active or idle.

The first NAS states, i.e., EMM-REGISTERED and EMM-DEREGISTERED, are associated with EPC mobility management (EMM) which is managed by the EMM protocol in the UE and the MME. The UE's EMM states depend on whether the UE is registered with the EPC. In the state EMM-REGISTERED, the UE is registered with a serving MME and a serving gateway (S-GW) and has an IP address and a default EPS bearer. In the state EMM-DEREGISTERED, the UE is switched off or our of coverage.

The second NAS states, i.e., ECM-IDLE and ECM-CONNECTED, are associated with EPS connection management (ECM). These states are managed by the EMM protocol. The state ECM-IDLE is also referred to as EMM-IDLE, and the state ECM-CONNECTED is also referred to as EMM-CONNECTED in a certain standard document (e.g., 3GPP TS 24.301) while terminologies 'ECM'-CONNECTED' and 'ECM-IDLE' are preferred in other standard documents (e.g., 3GPP TS 23.401). The UE's ECM states depend of whether the UE is active or on standby, from a NAS protocol perspective. An active UE is in ECM-CONNECTED state. In this state, all the data bearers and signalling radio bearers are in place. When on standby, a mobile is in ECM-IDLE. In this state, it would be inappropriate to hold all the bearers in place. Therefore, the network tears down a UE's S1 bearer and radio bearers whenever the UE enters ECM-IDLE. However, the EPS bearers remain in place, and the S5/S8 bearers also remain in place. When in idle, the MME does not know exactly where an idle UE is located. Instead, the MME just knows which tracking area (TA) the UE is in. The detailed features of the TA will be described below.

The AS states are associated with a radio resource control (RRC). These states are managed by the RRC protocol in the UE and a serving eNB. The UE's RRC state depends on whether it is active or idle, from an AS protocol perspective. An active UE is in RRC_CONNECTED state. In this state, the UE is assigned to a serving eNB, and can freely communicate using signalling message on Signalling Radio Bearers 1 (SRB1). When on standby, a UE is in RRC_IDLE. Mobility control in RRC_IDLE is UE-controlled (cell-reselection), while in RRC_CONNECTED it is controlled by the E-UTRAN (handover).

Hereinafter, the concept of mobility management (MM) and a tracking area (TA) (MM) is explained in detail. All UE-related information in the access network can be released during periods of data inactivity, i.e., the ECM-IDLE. The MME retains the UE context and information about the established bearers during the idle periods.

To allow the network to contact a UE in the ECM-IDLE, the UE updates the network as to its new location whenever it moves out of its current Tracking Area (TA). This procedure is called a 'Tracking Area Update (TAU)', and a similar procedure is also defined in a universal terrestrial radio access network (UTRAN) or GSM EDGE Radio Access Network (GERAN) system and is called a 'Routing Area Update (RAU)'. The MME serves to keep track of the user location while the UE is in the ECM-IDLE state.

When there is a need to deliver downlink data to the UE in the ECM-IDLE state, the MME transmits a paging message to all base stations (i.e., eNodeBs) in UE registered tracking area(s) (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. Upon receipt of a time value associated with the MM back-off timer, the UE may activate the MM back-off timer according to the time value given by the network. Under the current 3GPP specification, while the MM back-off timer associated with PS domain is running, UE is prohibited from performing the Tracking Area Update or Routing Area Update to the network. However, even when the MM back-off timer is running, the UE can receive a paging message and be thereby paged, if the network has downlink data for the UE. As explained above, when the UE responding the page message, the Service Request Procedure is required under the current 3GPP specification.

Hereinafter, the concept of an idle mode signalling reduction (ISR) function is explained in detail. The ISR function serves to enhance battery efficiency of the UE by reducing signaling for location registration (i.e., location update/registration update) when the UE moves between different access networks such as E-UTRAN and UTRAN/GERAN. When the UE camps on the E-UTRAN cell, the UE performs location registration on the MME. 'Camping on' indicates that a UE has completed a cell selection/reselection process and has chosen a cell. In the meantime, when the UE moves to the UTRAN/GERAN cell and camps on that cell, the UE performs location registration on the SGSN. Therefore, when the UE frequently moves between the E-UTRAN and the UTRAN/GERAN, the UE battery life may be shortened due to frequent location registration procedures. In order to reduce the battery impact when UE moving between two different RATs (Radio Access Technology)s, the ISR function has been used to avoid the repeated registration.

According to the ISR function, once the UE respectively performs location registration on the MME and the SGSN (two mobility management nodes) via the E-UTRAN and the UTRAN/GERAN, the UE in an idle mode does not perform an additional location registration when moving between two pre-registered Radio Access Technologies (RATs), or when reselecting a cell in one of the registered areas. If there is downlink (DL) data that should be sent to a corresponding UE in an ISR activated state and an idle mode, paging is simultaneously delivered to the E-UTRAN and the UTRAN/GERAN. This allows the network to successfully search for the UE and to deliver the DL data to the UE.

Hereinafter the concept of 'TIN' is explained in detail. When a UE accesses a network, the network may allocate a temporary identity to the UE. For instance, a 2G/3G network (e.g., GERAN/UTRAN) allocates a Packet Temporary Mobile Subscriber Identity P-TMSI to the UE, while the SAE system allocates a Global Unique Temporary Identity (GUTI) to the UE. Since the UE may move between different networks (e.g., GERAN/UTRAN/E-UTRAN), when the UE in idle mode reselects a cell controlled by a new CN node, the original CN node, which maintains the UE context, needs to be found by using a temporary identity of the UE, which was assigned by the original CN node and can be used to identify the original CN node and the UE context, to obtain the context of the UE. Therefore, when using the ISR function, the UE hold a Temporary Identity used in Next update (TIN), which is a parameter indicating which type of temporary identity shall be used in the next signaling with the core network, which can be TAU or RAU. Possible values of TIN include 'GUTI' (i.e., the UE's identification known to the MME), 'P-TMSI' (i.e., the UE's identification known to the SGSN) and 'RAT related TMSI'. For instance, in a situation where the TIN is set to the GUTI, the new SGSN can fetch the UE's context from the old MME by receiving a RAU request with an identity mapped from the GUTI. While the GUTI is not a native identification to the SGSN, context exchange can be performed by using the identity mapped from the GUTI.

Figure 4:
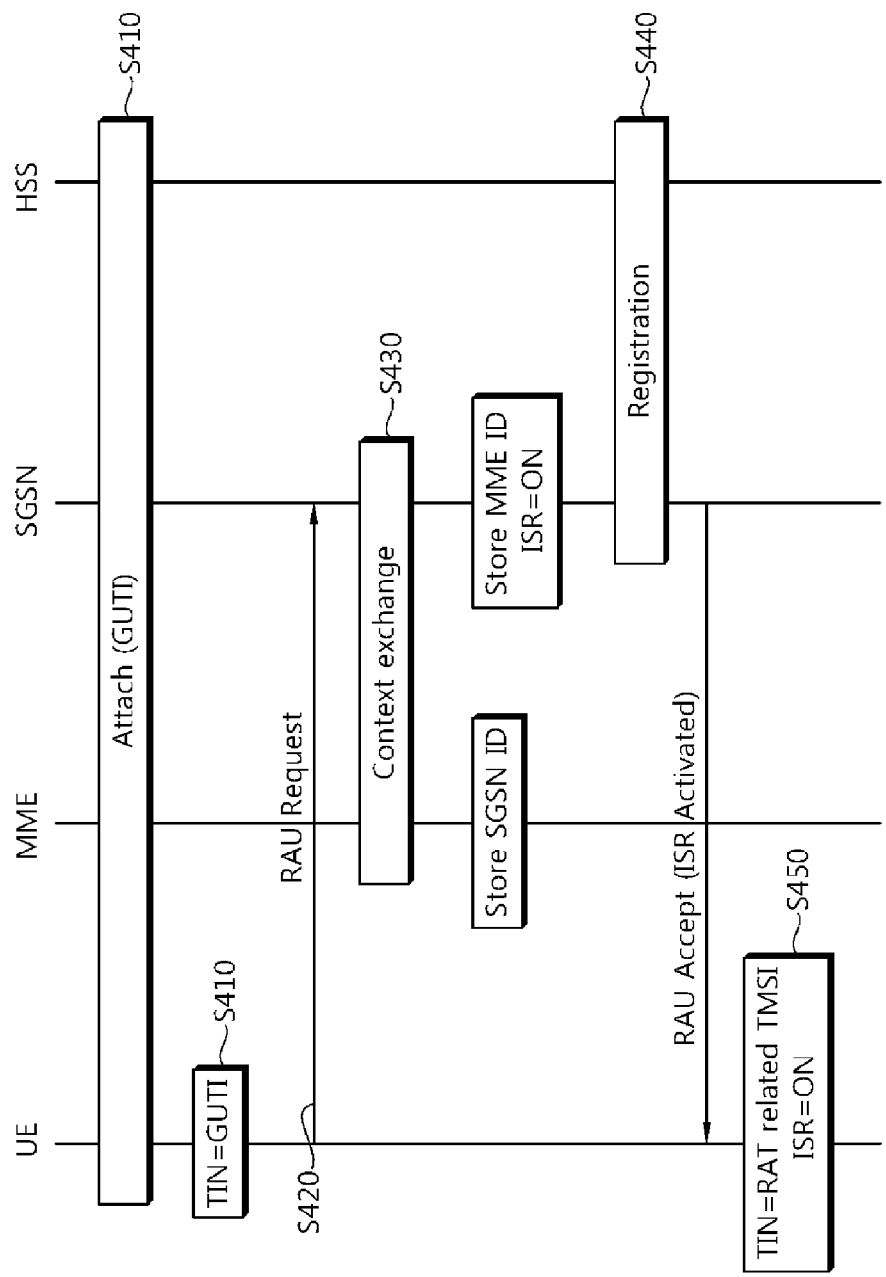
FIG. 4 is a flowchart illustrating a procedure for ISR activation by using TIN.

FIG. 4 is a flowchart illustrating a procedure for ISR activation by using the TIN. In step S410, in a case where no ISR is activated, a normal attach is performed in the E-UTRAN. As a result, the UE sets its TIN to 'GUTI'. As discussed above, once the TIN is set to 'GUTI', the UE uses 'GUTI' for a subsequent TAU or RAU procedure.

In step S420, the UE now selects GERAN/UTRAN as its desired access although it stays in the idle mode. The UE transmits a RAU request to the SGSN by using the 'GUTI' as indicated by its TIN. In particular, the UE transmits a RAU request to the SGSN including a P-TMSI and a Roting Area Identity (RAI), which are mapped from the GUTI.

In step S430, the SGSN fetches from the MME the UE's context, and the MME indicates ISR support. In step S440, registration of SGSN with the HSS is performed.

In step S450, an indication for ISR activation is included in the RAU accept message. Under the current 3GPP specification, the UE sets its TIN to 'RAT related TMSI' when the ISR function is activated. When the TIN is set to 'RAT related TMSI', a UE's identification for a subsequent TAU or RAU procedure is determined by the type of RAT which the UE is currently camping on. Namely, when the TIN is set to 'RAT related TMSI', the UE uses the GUTI when camping on an E-UTRAN cell and uses the P-TMSI when camping on a GERAN/UTRAN cell.

Hereinafter, the concept of CS-fallback function is explained. As discussed above, 3GPP technology specifies fallback for circuit switched services associated with the CS domain. The CS-fallback in the EPS enables the provisioning of voice and traditional CS-domain services, and LTE may reuse CS infrastructure when the UE is served by LTE. A CS-fallback enabled UE, connected to E-UTRAN may use GERAN or UTRAN to connect to the CS domain. This function is available in case E-UTRAN coverage is overlapped by either GERAN coverage or UTRAN coverage.

Figure 5:
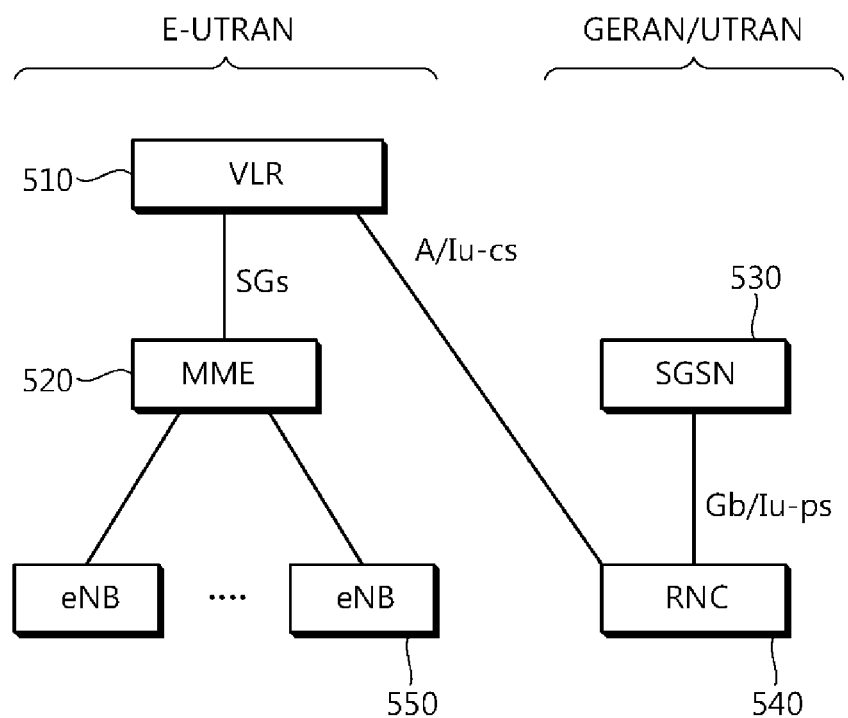
FIG. 5 is a block diagram showing reference architecture to which CS-fallback function is applied.

FIG. 5 is a block diagram showing reference architecture to which the CS-fallback function is applied. Referring to FIG. 5, the reference architecture includes a visitor location register (VLR) 510, the MME 520, the SGSN 530, the RNC 540, the eNB 550. Between the network elements shown in FIG. 5, various interfaces such as an A/Iu-cs, SGs, and Gb/Iu-ps are defined.

The VLR 510 contains CS subscriber data required for CS call handling and mobility management context for mobile subscribers currently located in the area controlled by the VLR. In particular, the VLR 510 maintains the UE's CS context. The VLR 510 can be included in a mobile switching center (MSC) and referred to as a MSC/VLR.

The CS fallback capable UE in E-UTRAN coverage which has been registered to the MME 520 and the VLR 510 can be paged for the CS or the PS services using a CS or a PS paging message, respectively. The CS paging can be initiated by the VLR 510 and the PS paging can be initiated by the MME 520. The CS paging can be transmitted from the VLR 510 to MME 530, although the MME 530 is an entity handling the UE's PS context. When the CS paging is given to the eNB 550, the eNB 550 pages the UE by including an indicator indicating the CS paging is transmitted. In response to the CS paging, the UE initiates an extended service request procedure to the MAC 520. The MME 520 then decides whether to allow the UE's operation in CS domain, thereby enabling the eNB 550 to perform subsequent procedures such as PS handover or redirection to the CS domain. Finally, the UE finishes CS services such as a CS voice call and thereafter moves back to E-UTRAN.

As discussed above, the CS fallback capable UE which has been registered to the MME 520 and the VLR 510 may enter the GERAN/UTRAN coverage from E-UTRAN coverage due to the CS paging. However, the UE may enter the GERAN/UTRAN coverage even when no CS paging is received, i.e. when UE moving out of E-UTRAN coverage. In this situation, the UE performs the RAU procedure to the PS domain if the ISR function is not enabled/activated. Furthermore, UE may need to perform a location area update procedure to update the UE's location with VLR in a situation that GERAN/UTRAN cell's Location Area Identity is not the same as what UE previously registered to when in E-UTRAN. The RAU procedure is associated with the PS domain for location update purposes, while a 'location area update (LAU)' procedure is the one for the CS domain. In general, the coverage of the location area (LA) for the CS domain is greater than that of the routing area (RA) or Tracking Area (TA).

In order to perform the LAU, LA code should be received by a broadcast channel. The LA code is combined with a PLMN-ID, which is already known to the UE, and thus the UE may detect the LA code by checking the broadcast channel. The identification (ID) information containing the PLMN-ID and the LA code can be referred to as LA identification (LAI).

The CS fallback capable UE may already have an old LAI before it enters the GERAN/UTRAN coverage, since the old LAI may be given when previously registered to the VLR 510. Under the current 3GPP standards, if the UE receives a different LAI different from the old one, it performs the LAU to the new network. Otherwise, the UE does not perform the LAU. It is likely that UE is still within the same LA when moving out of E-UTRAN to GERAN/UTRAN cells. In this situation, if TIN indicates GUTI, the UE only performs RAU to SGSN 530 and does not performs LAU to the VLR 510. The RAU procedure may or may not enable ISR for the UE. Because VLR 510 is not informed that UE has moved to GERAN/UTRAN, when CS calls arrives, the VLR 510 will still request MME 520 to perform paging. If the ISR is not enabled, the MME will inform the VLR 510 that UE has moves out of MME controlled area, such that VLR 510 should perform CS paging in GERAN/UTRAN cells in the same LA. If the ISR is enabled, the MME 520 will performs the CS paging in E-UTRAN, and it also informs the SGSN 530 to perform CS paging concurrently in UTRAN/GERAN.

The aforementioned MM backoff timer can be signaled for two core network domains, i.e., a PS and CS MM backoff timers. Further, a UE is prevented from performing the LAU while the CS MM backoff timer is running and a UE is prevented from performing RAU/TAU while the PS MM backoff timer is running.

In the communication system depicted in FIG. 5 may have a technical problem in which the UE becomes unreachable when the CS paging is initiated. The problem may occur when the CS fallback capable UE has finished a combined registration (UE's registration in both PS and CS domains) but has not received the CS paging yet. For the UE the ISR function is not activated, and the UE may have received a PS MM backoff time value and started the PS MM backoff timers before performing the RAU procedure when moving to GERAN/UTRAN. In a case where the UE in the above situations camps on an LTE cell and eventually receives a CS paging, there would be no technical problem since the MME to which the UE was registered handles the CS paging. However, in a case where the UE in the above situations camps on a GERAN/UTRAN cell during PS MM backoff timer is running and eventually VLR receives a incoming call to the UE, the above technical problem occurs, since the UE has not finished a RAU procedure due to the PS MM backoff timer and the VLR, MME has no updated information on the UE's registration.

It is noted that the above problem cannot be solved by merely manipulating the PS MM backoff timer. In particular, if the LA of the GERAN/UTRAN cell is different from what UE has registered in E-UTRAN, the UE may receive the CS paging, if the LAU is successfully performed and the CS paging is successfully delivered to the RNC. However, in a case where the UE has the same LAI as the previous one and the RAU is not successfully performed due to PS MM backoff, the above technical problem still occurs since the UE's LAU attempt is prevented and the RAU is the only procedure to update the UE's location.

The first embodiment of the present description solve the above technical problem. In particular, the first embodiment proposes to perform the LAU in a certain situation. The first embodiment is applicable to a case where the ISR is disabled, the old and new LAIs are identical, and PS MM backoff timer (i.e., T3346) is running. In this case, the first embodiment proposes to perform the LAU operation, thereby delivering the updated UE information to the VLR via the LAU operation.

In other words, the first embodiment is applicable to a case where: i) the UE successfully performed a combined TAU in LTE, with ISR disabled; ii) the UE later performs another TAU or RRC connection request but rejected with T3346; iii) the UE moves out of LTE coverage and enters an area with 2G/3G only in the same LA; and iv) the UE cannot perform Routing Area Updating (RAU) due to T3346 running; The first embodiment includes features in which when UE reselects from S1 mode (LTE) to A/Gb or Iu (2G/3G) mode while T3346 is running, and if UE will be monitoring CS page in 2G/3G, the UE should do the location area update (LAU) even the LA has not changed after the reselection.

The first embodiment is applicable to a case where the ISR is not enabled. However, the present description further provides the second embodiment applicable to a case where the ISR is enabled.

Figure 6:
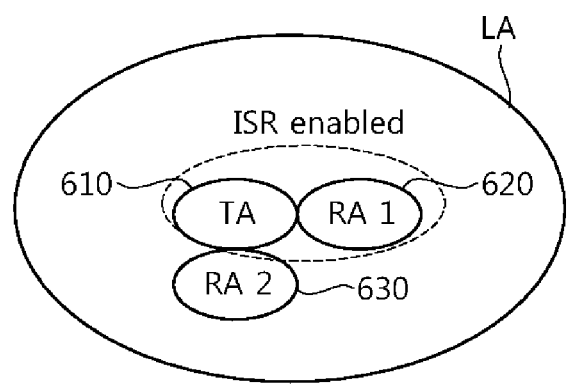
FIG. 6 is a flowchart illustrating a situation where one of embodiments is applied.

FIG. 6 is illustrating a situation where the second embodiment is applied. If the UE moves between the tracking area (TA) 610 and routing area (RA) 620 for which the ISR function is enabled, the above technical problem may not occur. In particular, if the ISR function is enabled with respect to TA 610 and RA 620, the MME and SGSN which are associated with TA 610 and RA 620 maintain the UE context. Therefore, even if the CS paging is initiated in the VLR, it will be delivered to the SGSN via the MME from the VLR, and therefore the UE will receive the paging via the RNC.

However, if the UE enters from TA 610 to RA 630 while the ISR function is enabled between TA 610 and RA1 620, the aforementioned CS paging issue may still occur because the MME would still request paging in RA1 620 instead of RA2 630. Therefore, the second embodiment does not require the ISR function to be disabled when performing the LAU operation if the old and new LAI are identical, and if the PS MM backoff timer is running.

Figure 7:
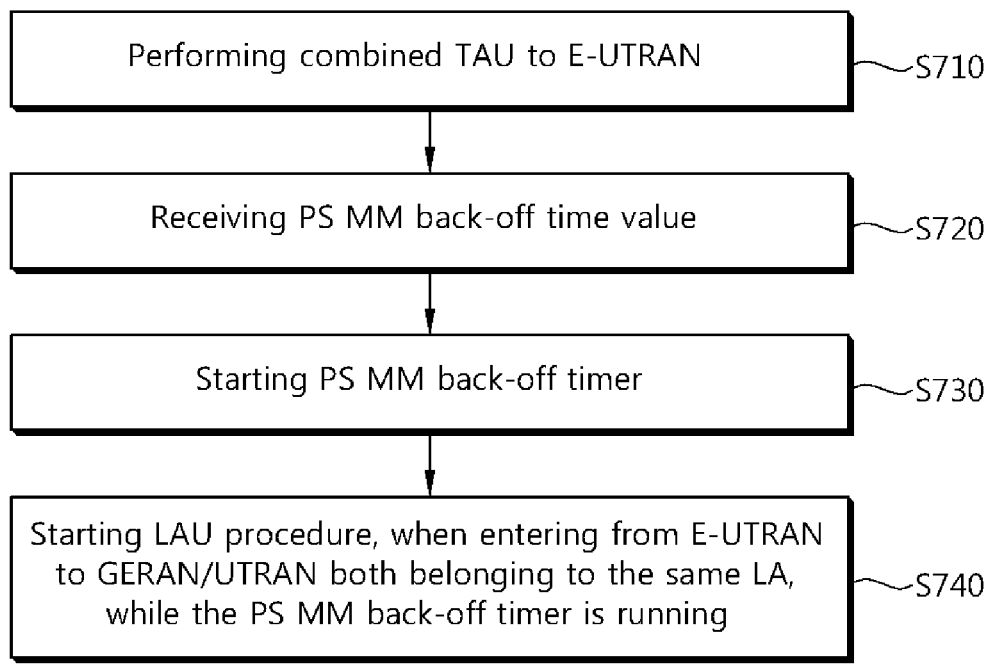
FIG. 7 is a flowchart illustrating a situation where one of embodiments is applied.

FIG. 7 is a flowchart showing an example of a method combining a number of embodiments. The method of FIG. 7 is applicable to system comprising an E-UTRAN side having the MME handling the PS domain and the VLR handling the CS domain.

Referring to FIG. 7, in step S710, the CS fallback capable UE performs a combined track area update (TAU) to E-UTRAN, thereby registering the UE's updated information to the MME and the VLR. In other words, the UE's location is updated in PS and CS domains.

In step S720, the UE receives a PS mobility management (MM) back-off time value from the E-UTRAN. The PS MM back-off timer value can be included in various messages such as an RRC connection release message, an RRC connection reject message, a RAU reject message, and/or a TAU reject message.

In step S730, upon receiving the PS MM back-off time value, the UE initiates the PS MM back-off timer. As discussed above, while the PS MM back-off timer is running, a subsequent RAU is prohibited.

In step S740, when entering from a E-UTRAN cell to a GERAN/UTRAN cell both belonging to same location area (LA), the UE starts the LAU, while the PS MM back-off timer is running.

Accordingly, the example of FIG. 7 is applicable to a case in which: i) the UE successfully performed a combined TAU in LTE, with ISR disabled or enabled; ii) the UE later performs another TAU or RRC connection request but rejected with T3346; iii) the UE moves out of LTE coverage and enters an area with 2G/3G only in the same LA; iv) the UE cannot perform Routing Area Updating (RAU) due to T3346 running; The first and second embodiments include features in which when the UE reselects from S1 mode (LTE) to A/Gb or Iu (2G/3G) mode while T3346 is running, and if the UE will be monitoring CS page in 2G/3G, the UE should do the location area update (LAU). Further, a condition triggering the LAU can be further narrowed to apply to UEs with ISR deactivated with its TIN set to the 'GUTI'. In addition, a condition triggering the LAU can be further narrowed to apply to UEs with ISR activated with its TIN set to 'RAT related TMSI' but moves to a different RA than previously registered.

Further, the above triggering condition of the LAU can be further modified. In particular, the example of FIG. 7 is a case where the UE cannot perform MM procedure in the PS domain since the T3346 is currently running. However, the above technical features are applicable to a case where the mobile originated (MO) signaling for the PS domain is prohibited by access barring or enhanced access barring. In 3GPP, various access barring can be applied to the UE. In particular, random access procedure can be prohibited by an Access Class (AC) barring. For a certain type of UEs, if a UE initiates an MO call or MO signaling, the UE draws a random number. If the drawn number is lower than the probability factor, access is not barred. Otherwise access is barred for a duration which is randomly selected based on the broadcasted barring timer value. The enhanced access barring further extends the functionality and may be associated with roaming. In particular, when network congestion occurs, the operator may block the access of visiting users by barring the roaming UEs' access.

When the mobile originated (MO) signaling for the PS doming is prohibited by access barring or enhanced access barring, the above problem also occurs. Therefore, the above features are also applicable to a case where the UE cannot perform MM procedure in the PS domain due to the access barring or enhanced access barring.

Hereinafter, the third embodiment related to a CS emergency call and CS paging. The UE may make an emergency call connection with a Public Safety Answering Point (PSAP). The PSAP, sometimes called Public Safety Access Point, is a call center responsible for answering calls to an emergency telephone number for emergency services such as police, firefighting, and ambulance services. The emergency call can be established in the CS or PS domain.

In general, the UE in the PS domain may initiate a PS emergency call, but there is a situation where the UE in the PS domain attempts a CS emergency call. For instance, if the E-UTRAN network does not support emergency bearer services in S1 mode, the UE may attempt to access the GERAN/UTRAN to set up the emergency call by using the CS domain.

When a PS/CS call is completed, an RRC connection for the UE may be released with a timer T320 in E-UTRAN, T322 in UTRAN or T3230 in GERAN. In E-UTRAN, the RRC Connection Release message includes a 'idleModeMobilityControlInfo' field, which indicates cell reselection priority information. Similarly the dedicated reselection priorities can be signaled in UTRAN/GERAN. The cell reselection priority information indicates priority of radio access network for a subsequent access. The T320, T322, T3230 is used for the cell reselection priority information. In particular, information of the 'idleModeMobilityControlInfo' is regarded to be valid while the T320 is running. Once the timer expires, the UE may detect a broadcast channel and determine what type of radio access network (e.g., LTE/3G/2G) is the best priority for a subsequent access.

Figure 8:
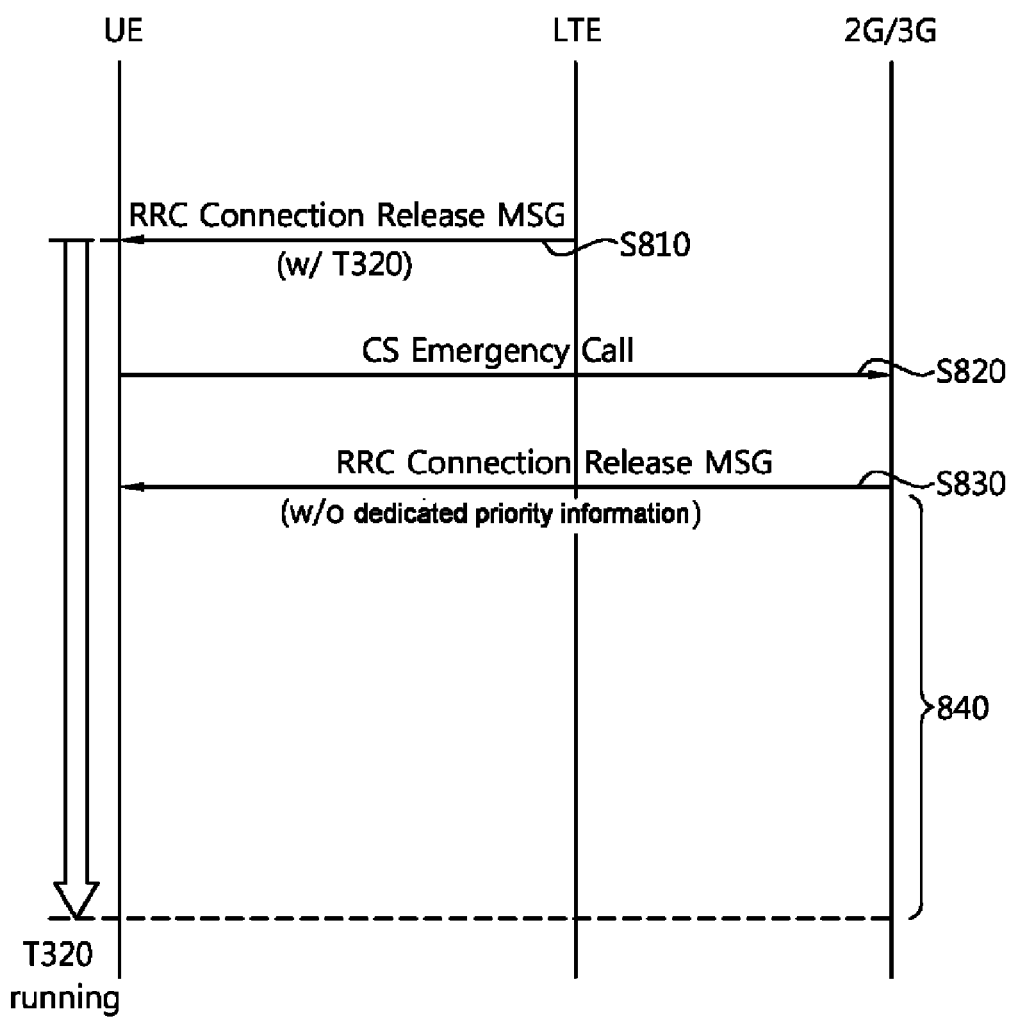
FIG. 8 is a flowchart illustrating a procedure of applying cell reselection priority information included in an RRC Connection Release message.

FIG. 8 show a procedure of applying the cell reselection priority information included in the RRC Connection Release message. Referring to FIG. 8, in step S810, the UE's RRC Connection for the emergency call is released and the 'idleModeMobilityControlInfo' field is received. Since the timer 320 is included in the RRC Connection Release message from the E-UTRAN, cell reselection priority information of the 'idleModeMobilityControlInfo' will be applied while the T320 is running. In step S820, the UE may initiate the emergency call to the GERAN/UTRAN. After establishing the emergency call, in step S830, the RRC connection for the emergency call is released, but the dedicated reselection priorities is not included in the new RRC Connection Release message. In this case, a time duration 840 is a period to which the previous 'idleModeMobilityControlInfo' field received from the LTE is applied. After the T320 expires, the UE applies cell reselection priority information which is broadcast in the system information.

The emergency call to the PSAP may be dropped for various reasons. In this situation, the PSAP will attempt an emergency call-back to the original UE. For instance, a CS emergency call from a UE which has performed the combined TAU to the MME and the VLR may be dropped. If the UE has not performed RAU to the GERAN/UTRAN, stays in the same LA, and reselects back to E-UTRAN after the CS emergency call, the UE's previous information in the VLR is correct, and a CS paging for emergency call-back to the UE can be properly handled by the VLR. Therefore, an emergency call-back to the original UE from the PSAP will be properly handled by the VLR.

Figure 9:
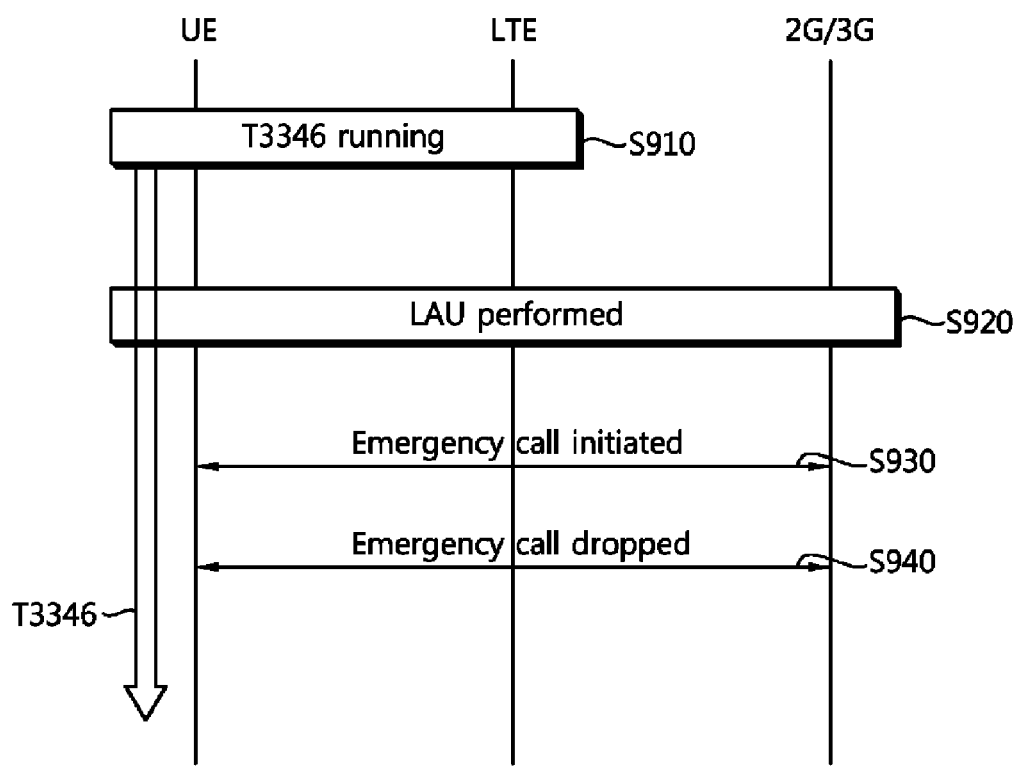
FIG. 9 is a flow chart illustrating a procedure handing the CS emergency call-back and cell reselection priority information.

However, there may occur a technical problem when handing the CS paging as depicted in FIG. 9. FIG. 9 is a flow chart illustrating a procedure handing the CS emergency call-back and cell reselection priority information. The specific order of steps in FIG. 9 is shown for exemplary purposes, and the present description is not limited thereto. Referring to FIG. 9, in step S910, the MM-BO timer (i.e., T3346) is running between the UE and the MME for various reasons (e.g., RRC Connection Reject due to network congestion). Thereafter, as depicted in steps S920-930, the UE may perform the LAU procedure and initiate a CS emergency call. However, as depicted in steps S940, the emergency call may be dropped and the UE may still have a valid reselection priority with E-UTRAN being the highest priority RAT.

If the dedicated reselection priority (which may come from a prior RRC connection release in E-UTRAN before the CS emergency call with timer T320), which designate an E-UTRAN cell as the highest priority cell, there occurs a technical problem in which the CS-paging for the emergency call-back cannot be delivered to the UE. This is because, the UE has performed LAU is 2/3G area but cannot perform combined TAU when reselecting back to the E-UTRAN cell before the T3346 expires. Therefore, the VLR, which only holds incorrect information that the UE has entered the GERAN/UTRAN by the LAU operation (S920), cannot properly handle the CS-paging for the emergency call-back.

Therefore, the third embodiment of the present description proposes to disable the LTE capability (i.e., E-UTRA capability) in the above situation. In other words, the third embodiment is applicable to a case where the UE is unable to perform a combined TAU after emergency CS fallback. Examples of a case includes various situations such as a case in which: i) the UE successfully performed a combined TAU in the LTE; ii) the UE later performs another TAU or RRC connection request but rejected with the timer T3346, and the 'IdelModeMobilityControlInfo' indicates the LTE with the highest priority and includes the timer T320; iii) the UE makes an emergency call and performs the LAU before/after the call; and iv) the UE selects back to a LTE cell of the same or different TA after the emergency call finishes while the T320 and T3346 are still running.

The above problematic case can be resolved by mandating the UE stays in the GERAN/UTRAN after the CS emergency call, instead of reselecting back to the E-UTRAN. Namely, the LTE capability can be disabled, such that RRC reselection priority can be ignored by the UE.

Figure 10:
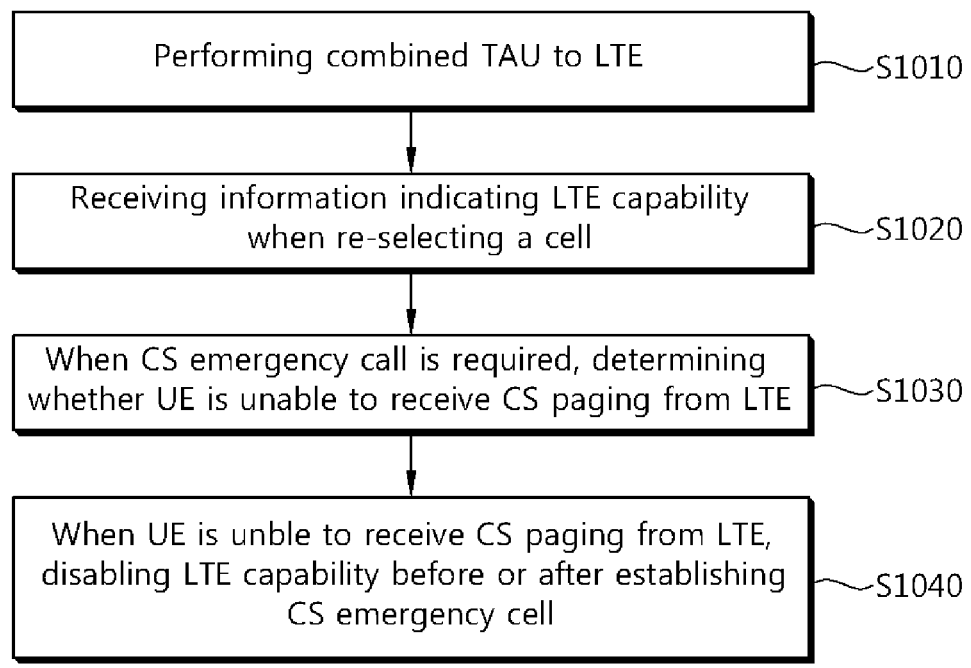
FIG. 10 is a flow chart illustrating a procedure of disabling the LTE capability when the UE is unable to perform CS fallback.

FIG. 10 is a flow chart illustrating a procedure of disabling the LTE capability when the UE is unable to perform combined TAU after a emergency CS fallback. Referring to step S1010, the UE performing a combined TAU to the MME and VLR. In step S1020, the UE receive information indicating LTE as the higher priority compared to 2/3G RATs. The information indicating LTE reselection priority can be included in the 'idleModeMobilityControlInfo' field of the RRC release message. Further, the information can be delivered to the UE with the timer T320. In steps S1030-S1040, the UE determines whether it is unable to receive a CS paging from the LTE, and when the UE is determined to be unable to receive the CS paging from the LTE, then the UE disables the LTE capability before or after establishing the CS emergency call.

Figure 11:
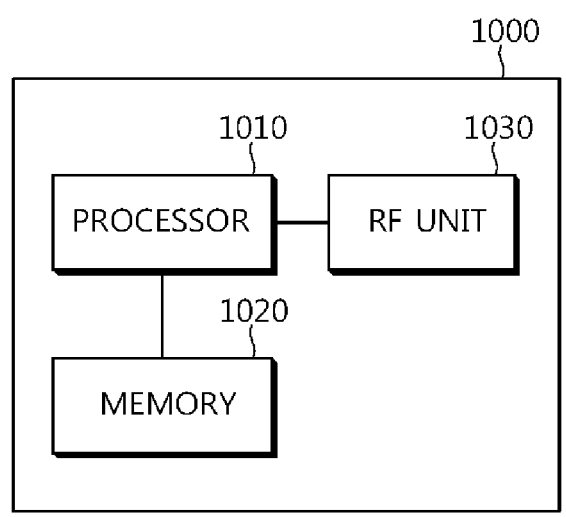
FIG. 11 is a block diagram showing a wireless apparatus to implement technical features of this description.

FIG. 11 is a block diagram showing a wireless apparatus to implement technical features of this description. This may be a part of a UE, or core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may perform procedure and embodiments described above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of communicating data in a wireless communication system including a first type network communicating based on a number of OFDM symbols, a second type network which is different from the first type network, and a user equipment (UE) which is communicating with at least one of the first type network and the second type network, the method performed by the UE which moves between a coverage of the first type network and a coverage of the second type network and comprising:

performing a combined track area update (TAU) to the first type network;

receiving a packet switched (PS) mobility management (MM) back-off time value from the first type network;

starting a PS MM back-off timer based on the received PS MM back-off time value;

when the UE moves from a first cell of the first type network to a second cell of the second type network, determining whether the PS MM back-off timer is running, whether the UE's Temporary Identity used in Next update (TIN) is set to a Global Unique Temporary Identity (GUTI), and whether the first cell and the second cell belong to a same location area (LA) associated with a circuit switched (CS) domain; and when the PS MM back-off timer is running, the UE's TIN is set to the GUTI, and the first cell and the second cell belong to the same LA, starting a location update procedure (LAU) procedure.

2. The method of claim 1, wherein the first type network includes a mobility management entity (MME) handling a PS domain, and a visitor location register (VLR) handling the CS domain.

3. The method of claim 1, further comprising:
receiving a TAU accept message indicating whether an idle mode signalling reduction (ISR) function is enabled.

4. The method of claim 1, further comprising:
performing an intersystem change from the first type network to the second type network before starting the location area update procedure.

5. The method of claim 1, wherein the UE's TIN is set to a GUTI.

6. The method of claim 1, wherein the UE is configured to use CS fallback.

7. A user equipment (UE) communicating data in a wireless communication system including a first type network communicating based on a number of OFDM symbols, a second type network which is different from the first type network, and the UE which is communicating with at least one of the first type network and the second type network, the UE moving between a coverage of the first type network and a coverage of the second type network and comprising:

a radio frequency unit communicating a signal; and
a processor coupled to the radio frequency unit and configured to:
perform a combined track area update (TAU) to the first type network;
receive a packet switched (PS) mobility management (MM) back-off time value from the first type network;
start a PS MM back-off timer based on the received PS MM back-off time value;
when the UE moves from a first cell of the first type network to a second cell of the second type network, determine whether the PS MM back-off timer is running, whether the UE's Temporary Identity used in Next update (TIN) is set to a Global Unique Temporary Identity (GUTI), and whether the first cell and the second cell belong to a same location area (LA) associated with a circuit switched (CS) domain; and
when the PS MM back-off timer is running, the UE's TIN is set to the GUTI, and the first cell and the second cell belong to the same LA, start a location update procedure (LAU) procedure.

* * * * *